(12) United States Patent
Goddard

(10) Patent No.: US 9,304,945 B2
(45) Date of Patent: Apr. 5, 2016

(54) SYNCHRONIZING PARALLEL APPLICATIONS IN AN ASYMMETRIC MULTI-PROCESSING SYSTEM

(71) Applicant: Raytheon Company, Waltham, MA (US)

(72) Inventor: Jeremy A. Goddard, Garland, TX (US)

(73) Assignee: RAYTHEON COMPANY, Waltham, MA (US)

(*) Notice: Subject to any disclaimer, the term of this patent is extended or adjusted under 35 U.S.C. 154(b) by 570 days.

(21) Appl. No.: 13/749,030

(22) Filed: Jan. 24, 2013

(65) Prior Publication Data

US 2014/0208043 A1  Jul. 24, 2014

(51) Int. Cl.
*G06F 9/46* (2006.01)
*G06F 9/455* (2006.01)
*G06F 12/14* (2006.01)
*G06F 9/52* (2006.01)
*G06F 9/50* (2006.01)
*G06F 9/54* (2006.01)

(52) U.S. Cl.
CPC .......... *G06F 12/1491* (2013.01); *G06F 9/5077* (2013.01); *G06F 9/526* (2013.01); *G06F 9/505* (2013.01); *G06F 9/545* (2013.01)

(58) Field of Classification Search
CPC ............ G06F 12/1466; G06F 12/0806; G06F 12/1491; G06F 9/5077; G06F 9/526; G06F 9/505; G06F 9/545
See application file for complete search history.

(56) References Cited

U.S. PATENT DOCUMENTS

| | | | |
|---|---|---|---|
| 6,529,933 B1 | 3/2003 | Montgomery et al. | |
| 7,370,156 B1* | 5/2008 | Nguyen et al. | 711/147 |
| 7,543,293 B2* | 6/2009 | Willman | G06F 9/468 711/2 |
| 7,734,933 B1* | 6/2010 | Marek et al. | 713/193 |
| 8,078,910 B1 | 12/2011 | Backensto et al. | |
| 8,209,510 B1* | 6/2012 | Thathapudi | G06F 12/145 711/163 |
| 2003/0041110 A1* | 2/2003 | Wenocur et al. | 709/206 |
| 2003/0084256 A1* | 5/2003 | McKee | G06F 12/1475 711/152 |

(Continued)

FOREIGN PATENT DOCUMENTS

CN  101894045  11/2010

OTHER PUBLICATIONS

Jonathan Eastep, Smartlocks: Lock Acquisition Scheduling for Self-Aware Synchronization, 2010, pp. 215-224.*

(Continued)

*Primary Examiner* — Thuy Dao
*Assistant Examiner* — Mongbao Nguyen
(74) *Attorney, Agent, or Firm* — Cantor Colburn LLP

(57) ABSTRACT

A method for synchronizing parallel applications in a partitioned asymmetric multi-processing system having multiple independent levels of security is provided. Synchronized access to a shared data memory region is provided for a first application through a first instance of a para-virtualized user library linked against a first application in a first domain having a first security level. Synchronized access is provided to the shared data memory region for a second application in parallel with the first application through a second instance of the para-virtualized user library linked against the second application in the first domain. The second instance of the para-virtualized user library also accesses the synchronization structure. Access is prevented to the shared data memory region and the synchronization structure by other applications in one or more other domains having other levels of security per domain.

16 Claims, 8 Drawing Sheets

(56) References Cited

U.S. PATENT DOCUMENTS

| | | |
|---|---|---|
| 2005/0015758 A1 | 1/2005 | North |
| 2006/0031844 A1* | 2/2006 | Dice et al. ............... 718/106 |
| 2007/0294689 A1 | 12/2007 | Garney |
| 2008/0126780 A1 | 5/2008 | Rajkumari et al. |
| 2008/0155203 A1 | 6/2008 | Aguilar et al. |
| 2008/0163206 A1* | 7/2008 | Nair ............... G06F 9/45533 718/1 |
| 2008/0244155 A1* | 10/2008 | Lee ............... G06F 12/145 711/6 |
| 2009/0241122 A1* | 9/2009 | Wong ............... G06F 9/5027 718/104 |
| 2010/0083275 A1* | 4/2010 | Jayamohan ............ G06F 9/461 718/108 |
| 2010/0192159 A1 | 7/2010 | White et al. |
| 2011/0145916 A1* | 6/2011 | McKenzie et al. .......... 726/19 |
| 2011/0289294 A1 | 11/2011 | Maeda et al. |
| 2011/0302589 A1* | 12/2011 | Aussagues ............ G06F 9/3851 718/104 |
| 2012/0011500 A1* | 1/2012 | Faraboschi ........ G06F 12/1491 718/1 |
| 2012/0151117 A1* | 6/2012 | Tuch ............... G06F 9/45558 711/6 |
| 2012/0167107 A1 | 6/2012 | de Cesare et al. |
| 2012/0311607 A1* | 12/2012 | Achterberg et al. ......... 718/107 |
| 2013/0036470 A1* | 2/2013 | Zhu et al. ..................... 726/23 |
| 2013/0061231 A1* | 3/2013 | Zhang et al. ................. 718/102 |
| 2013/0097354 A1* | 4/2013 | Arges ............... G06F 12/1458 711/6 |
| 2013/0097392 A1* | 4/2013 | Arges ............... G06F 9/468 711/152 |
| 2013/0166879 A1* | 6/2013 | Sun et al. ..................... 712/30 |
| 2013/0347131 A1* | 12/2013 | Mooring et al. ............... 726/29 |
| 2014/0189297 A1* | 7/2014 | Narvaez ............ G06F 9/45558 712/29 |

OTHER PUBLICATIONS

Jan Nowotsch, Leveraging Multi-Core Computing Architecture in Avionics, 2012, pp. 1-11.*
Volkmar Uhlig, The Mechanics of In-Kernel Synchronization for a Scalable Microkernel, 2007, pp. 1-9.*
International Application No. PCT/US13/69430, International Search Report and Written Opinion dated May 7, 2014, 24 pages.

* cited by examiner

SYNCHRONIZING PARALLEL APPLICATIONS IN AN ASYMMETRIC MULTI-PROCESSING SYSTEM

BACKGROUND

The present invention relates to computer processing systems, and more specifically, to the synchronizing parallel applications in an asymmetric multi-processing system.

Computer systems that include multiple independent levels of security (MILS) are typically implemented using asymmetric multi-processing (AMP). Asymmetric multi-processing enables the use of multiple processing cores where processing tasks are partitioned asymmetrically between processing cores according to security level and other factors. To port existing application programs to an AMP MILS system typically requires redesigning and re-implementing the application programs to make use of the resources of more than one processing core while operating within a desired level of security.

SUMMARY

According to one embodiment of the present invention, a method for synchronizing parallel applications in an asymmetric multi-processing system having multiple independent levels of security is provided. Synchronized access to a shared data memory region is provided for a first application through a first instance of a para-virtualized user library linked against the first application in a first domain having a first level of security. The synchronized access is provided through a para-virtualized standard synchronization application programming interface implemented as a user library accessing a synchronization structure. Synchronized access is provided to the shared data memory region for a second application in parallel with the first application through a second instance of the para-virtualized user library linked against the second application in the first domain having the first level of security. The second instance of the para-virtualized user library accesses the synchronization structure. Access is prevented to the shared data memory region and the synchronization structure by other applications in one or more other domains having other levels of security per domain.

According to another embodiment of the present invention, a partitioned asymmetric multi-processing system having multiple independent levels of security includes a first domain having a first level of security and one or more other domains having other levels of security per domain. The first domain includes one or more processing cores, a synchronization memory region, and a shared data memory region. The first domain is configured to provide synchronized access to the shared data memory region for a first application through a para-virtualized user library linked against the first application. The synchronized access is provided through a para-virtualized standard synchronization application programming interface implemented as a user library accessing a synchronization structure of the synchronization memory region. The first domain is further configured to provide synchronized access to the shared data memory region for a second application in parallel with the first application through a second instance of the para-virtualized user library linked against the second application. The second instance of the para-virtualized user library accesses the synchronization structure. Access to the shared data memory region and the synchronization structure by the one or more other domains is prevented.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
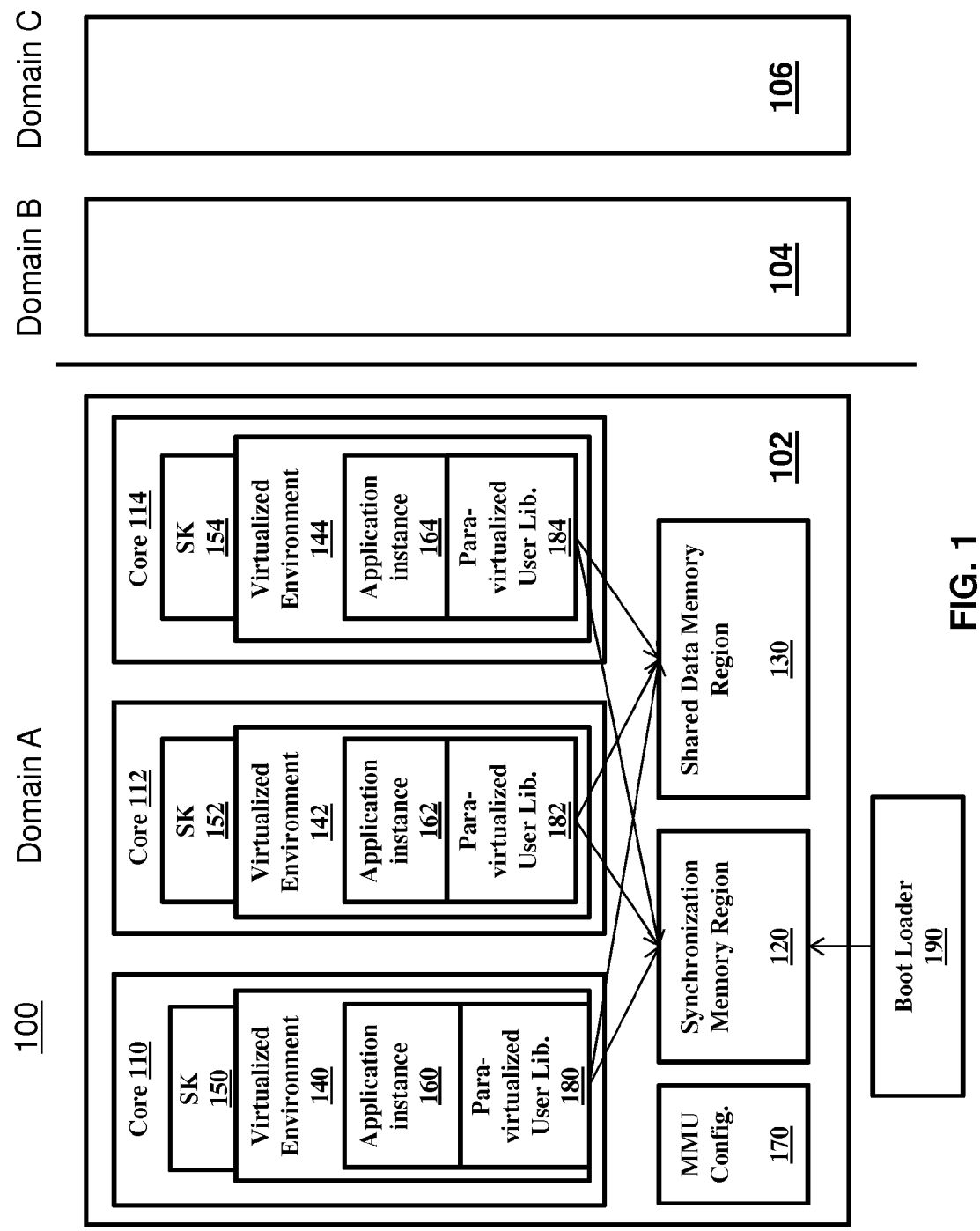
FIG. 1 illustrates a block diagram of an exemplary embodiment of an asymmetric multi-processing system with multiple independent levels of security.

The embodiments described herein include systems and methods for synchronizing parallel applications in an asymmetric multi-processing system with multiple independent levels of security. FIG. 1 illustrates a block diagram of an exemplary embodiment of an asymmetric multi-processing (AMP) multiple independent levels of security (MILS) system 100 including a first domain 102 (domain A), a second domain 104 (domain B), and a third domain 106 (domain C). The domains 102-106 contain one or more virtual environments running at the security level of the domain. For example, the first domain 102 can have a first level of security while the second and third domains 104 and 106 have other levels of security (e.g., top secret, secret, confidential, etc.). Each of the domains 102-106 defines a shared synchronization memory region and one or more shared data memory regions where resources are shared within each of the domains 102-106 but are isolated between each of the domains 102-106. For example, virtualized environments 140, 142, and 144 in the first domain 102 can share access to a synchronization memory region 120 and a shared data memory region 130, but virtualized environments in domains 104 and 106 are prevented from accessing memory regions 120 or 130 of the first domain 102. Preventing access to shared memory regions by virtual environments in other domains, such as domains 104 and 106, can be enforced by one or more memory management units under the control of a MILS separation kernel to maintain multiple independent levels of security in an asymmetric multi-processing mode within the system 100. Blocking access to synchronization structures across domains maintains each security level per domain.

In the example of FIG. 1, each of the processing cores 110, 112, 114 includes separation kernel (SK) 150, 152, 154. Each processing core 110-114 also contains one or more virtualized environment 140, 142, 144, each virtualized environment having an application instance 160, 162, 164. Each of the application instances 160, 162, 164 is linked against a respective para-virtualized user library 180, 182, 184 to provide synchronized shared access functions for memory regions 120 and 130. The virtualized environments 140-144 may be modified versions of known operating systems, such as LINUX, VxWorks, or High Assurance Environment (HAE). The SKs 150-154 provide separation of virtualized environments while allowing application instances 160-164 to access the shared data memory region 130 as synchronized through the synchronization memory region 120. The synchronization memory region 120 and the shared data memory region 130 may each include multiple regions of memory defined in separate address ranges. Although only a single application instance 160-164 is depicted in each of the virtualized environments 140-144, each core may support more than one virtualized environment, and the virtualized environments 140-144 may each support multiple application instances.

In exemplary embodiments, the virtual environments 140-144 are para-virtualized guest operating systems, i.e., modified operating systems configured to run as multiple guest operating systems alongside each other. One or more memory management units (MMUs) control access to addresses defining various memory regions, such as the shared data memory region 130, and support memory mapping and cache management. Various processes of the virtualized environments 140-144 may attempt to modify MMU configuration 170 to allow access the shared data memory region 130. Rather than allow the virtualized environments 140-144 to modify the MMU configuration 170, the SKs 150-154 can be configured to block or ignore requests to modify the MMU configuration 170 such that the virtualized environments 140-144 are unaware of their inability to modify the MMU configuration 170. Preventing dynamic reconfiguration of the memory regions ensures that statically defined synchronization structures remain consistently defined between the virtualized environments 140-144. MMU configuration modification functions of the SKs 150-154 ensure that only virtualized environments 140-144 have access to the synchronization memory region 120. To support synchronization between the application instances 160-164, the application instances 160-164 are linked against para-virtualized user library instances 180-184 which are modified user libraries configured to access synchronization features that may not otherwise be available to the virtualized environments 140-144. This may include, for example, portable operating system interface (POSIX) synchronization functions as further described herein.

The para-virtualized user library instances 180, 182, 184 can implement POSIX compatible application programming interfaces (APIs) to provide common synchronization methods to applications that are resident in other virtualized environments and/or processing cores within the same domain. The APIs may appear as standard synchronization APIs such that minimal modification is needed when porting preexisting applications to the system 100 as the application instances 160-164. The para-virtualized user library instances 180-184 may be separate instances of a common user library linked against each associated application instance 160-164. Para-virtualization is used to modify underlying structures and signaling to support synchronization for MILS across multiple processing cores per domain, such as processing cores 110-114 of the first domain 102. A boot loader 190 can be used to load a synchronization structure, such as synchronization structure 200 of FIG. 2, that is statically defined in the synchronization memory region 120. In an exemplary embodiment, the boot loader 190 performs loading of the synchronization memory region 120 prior to releasing the processing cores 110-114 to execute at system startup/reset.

Figure 2:
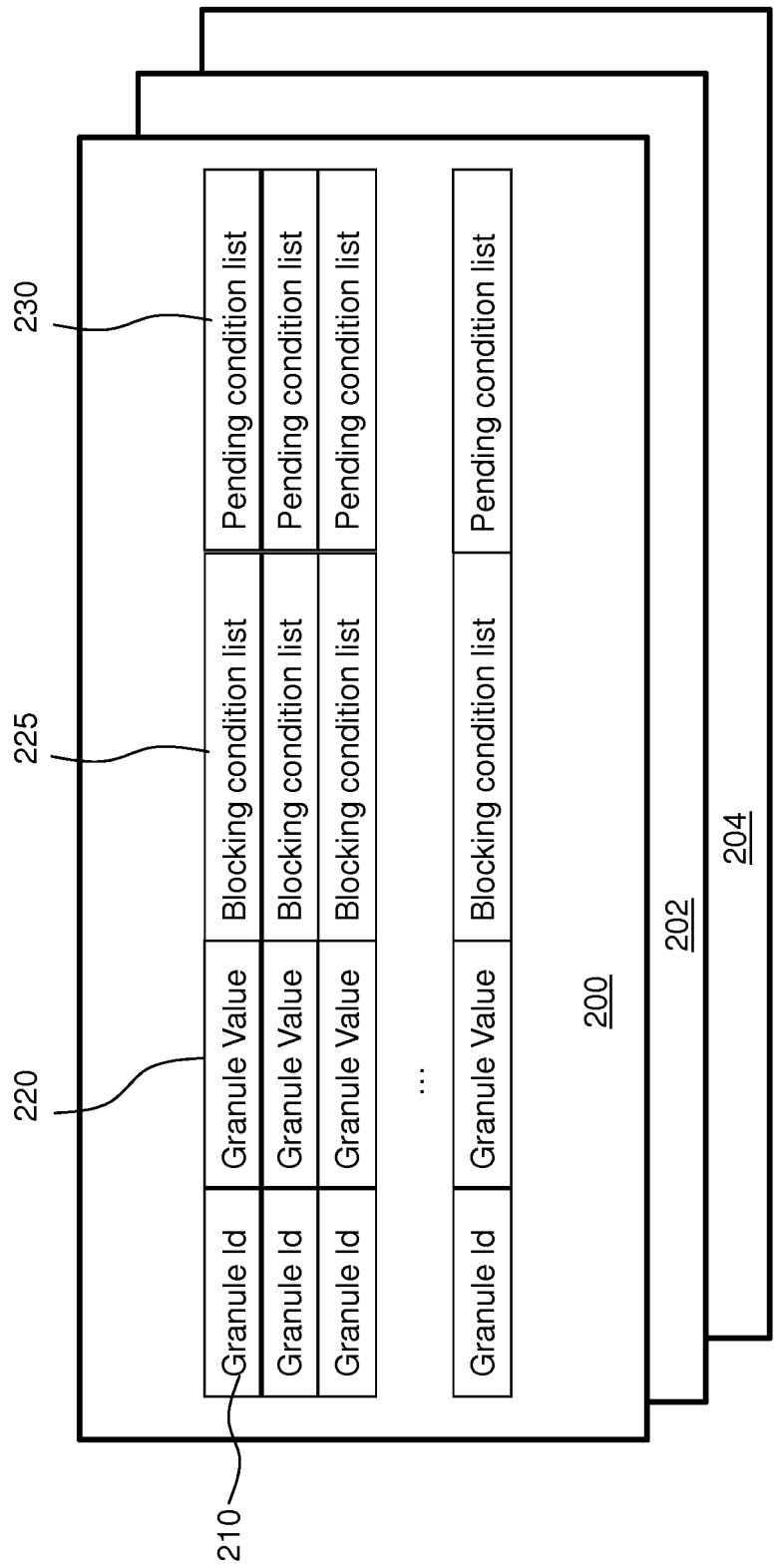
FIG. 2 illustrates an exemplary embodiment of synchronization structures for separate domains.

FIG. 2 illustrates example synchronization structures 200, 202, and 204 for different domains. The synchronization structure 200 may be located in the synchronization memory region 120 of the first domain 102 of FIG. 1, while the synchronization structures 202 and 204 may be located in domains 104 and 106 of FIG. 1 respectively. The example synchronization structure 200 of FIG. 2 includes granule identifiers 210 for a plurality of shared data memory granules of the shared data memory region 130 of FIG. 1, granule values 220, blocking conditions 225, and pending conditions 230. The granule identifiers 210 serve as index values to locate entries in the synchronization structure 200. Each shared data memory granule is an independently lockable section or block of the shared data memory region 130 of FIG. 1 having a lock status defined by the granule values 220. The blocking conditions 225 can include a list of blocking applications (e.g., blocked tasks or process instances) associated with each of the granule identifiers 210. The pending conditions 230 can include a list of pending signals associated with each of the granule identifiers 210. Once a shared data memory granule is locked, it is reserved for exclusive access by a process holding the lock until the lock is released. Each of the granule identifiers 210 and the granule values 220 can be implemented as 32-bit integer fields. The blocking conditions 225 and the pending conditions 230 may be implemented as condition lists that extend conventional synchronization structures to include a processing core identifier, a virtual interrupt identifier, and a hardware interrupt identifier while omitting references to other threads used to schedule threads in a conventional system.

Figure 3:
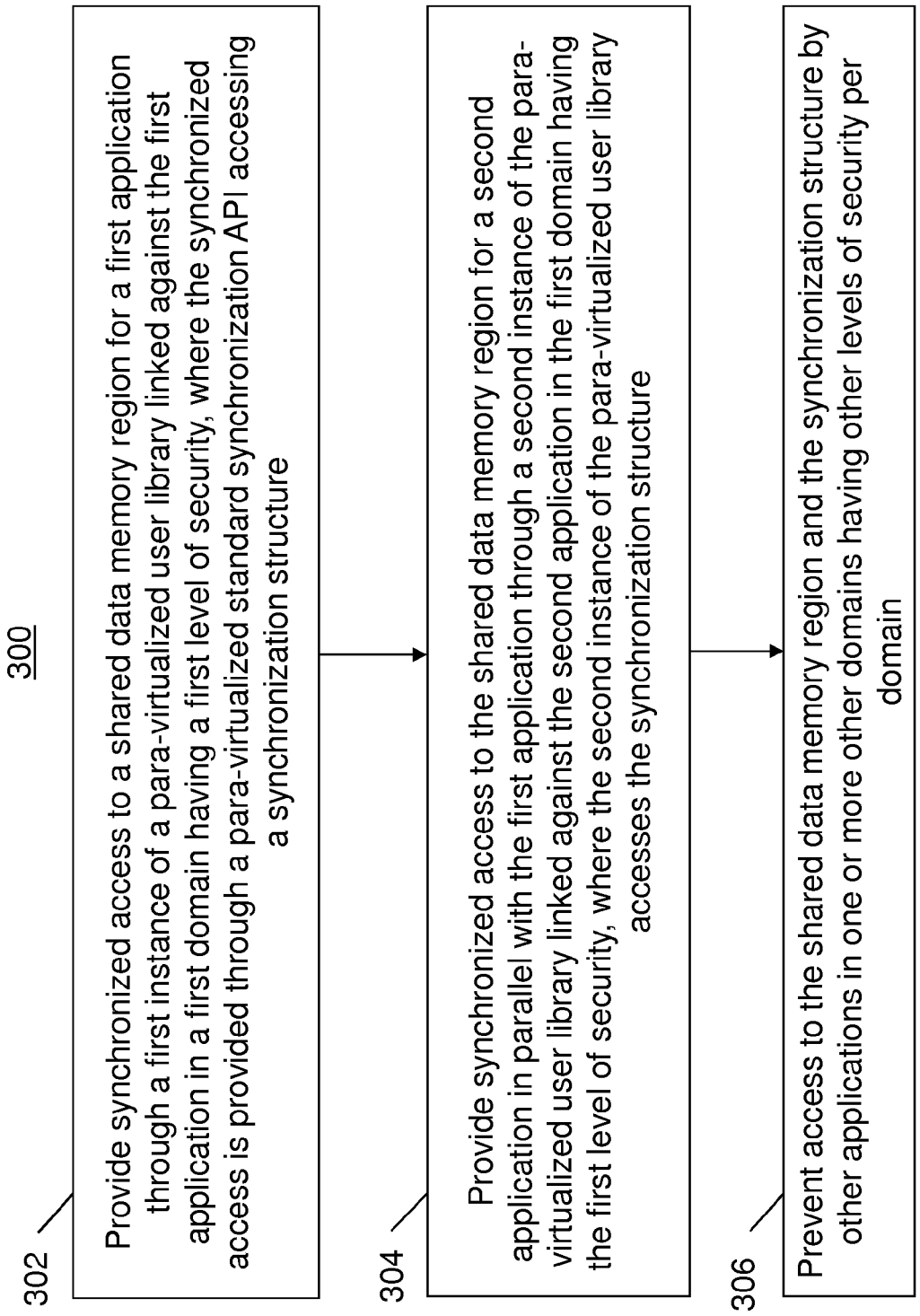
FIG. 3 illustrates an exemplary process for synchronizing parallel applications in an asymmetric multi-processing system having multiple independent levels of security.

FIG. 3 illustrates an exemplary process 300 for synchronizing parallel applications in an asymmetric multi-processing system having multiple independent levels of security. The process 300 can be implemented in the system 100 of FIG. 1. At block 302, synchronized access to shared data memory region 130 of FIG. 1 is provided for a first application through a first instance of a para-virtualized user library linked against the first application in a first domain having a first level of security, such as application instance 160 and para-virtualized user library instance 180 of domain 102 of FIG. 1. The synchronized access is provided through a para-virtualized standard synchronization API implemented as a user library accessing a synchronization structure, such as the synchronization structure 200 of FIG. 2. At block 304, synchronized access is provided to the shared data memory region 130 of FIG. 1 for a second application in parallel with the first application through a second instance of the user library linked against the second application, such as application instance 162 and para-virtualized user library instance 182 of domain 102 of FIG. 1. The synchronized access is provided through a para-virtualized standard synchronization API implemented in a user library linked against the second application, accessing the synchronization structure, such as the synchronization structure 200 of FIG. 2. At block 306, access is prevented to the shared data memory region and the synchronization structure by other applications in one or more other domains, such as domains 104 and 106 of FIG. 1, having other levels of security per domain. Limited access to shared memory regions is enforced by a memory management unit configured by an SK, such as the MMU configuration 170 of FIG. 1.

A variety of para-virtualized functions can be modified to support asymmetric multi-processing with multiple independent levels of security. Examples of para-virtualized functions for synchronization in a POSIX API for POSIX threads (pthreads) include: pthread_mutex_init, pthread_mutex_destroy, pthread_mutex_attr_init, pthread_mutex_attr_destroy, pthread_mutex_lock, pthread_mutex_unlock, pthread_mutex_trylock, pthread_cond_init, pthread_cond_destroy, pthread_condattr_init, pthread_condattr_destroy, pthread_cond_wait, pthread_cond_signal, and pthread_cond_broadcast. Other standard synchronization processes can also be para-virtualized, such as communication APIs.

Figure 4:
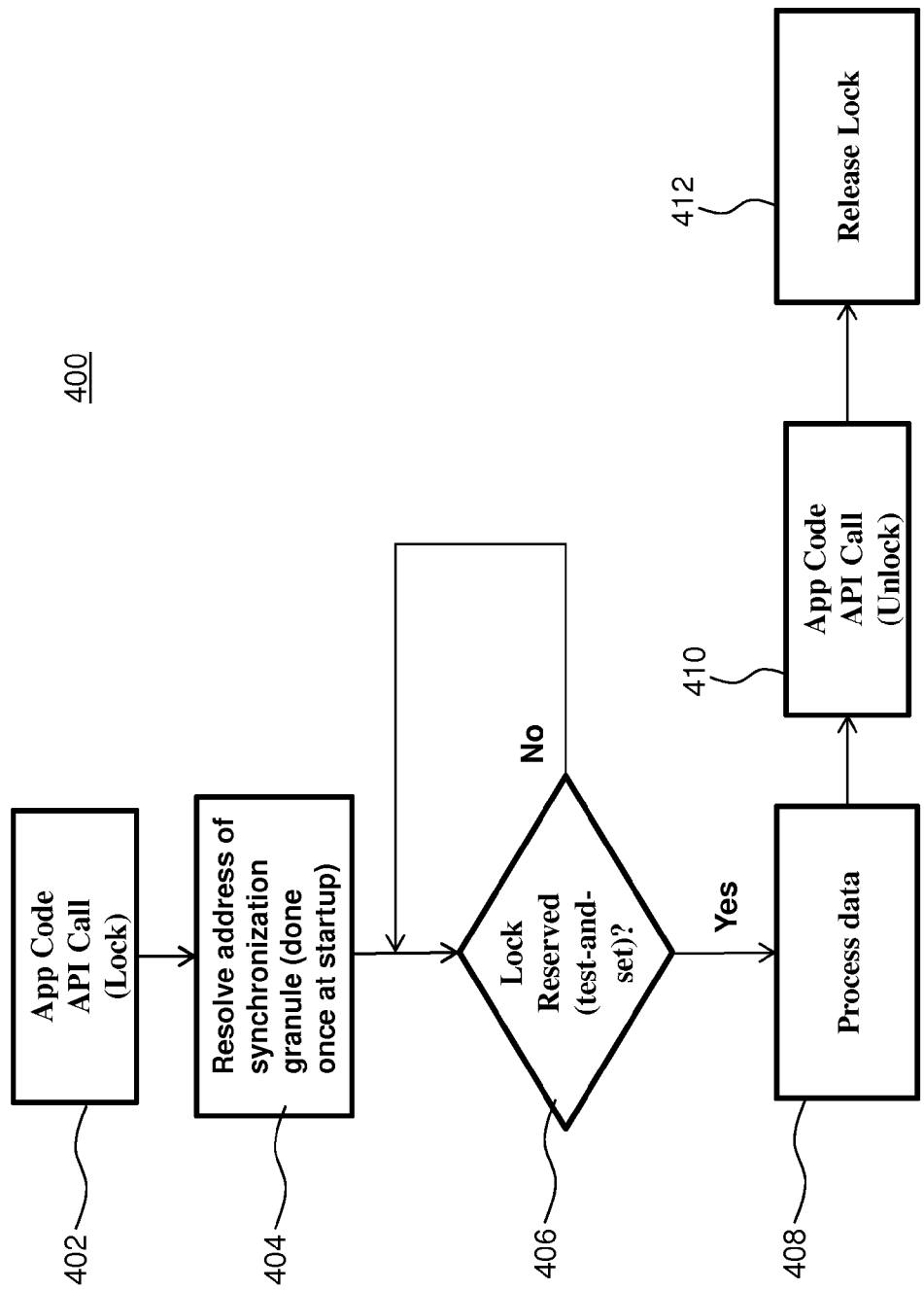
FIG. 4 illustrates an exemplary embodiment of a spinlock based synchronization function.

An example process for a spinlock based synchronization function 400 is depicted in FIG. 4. The spinlock based synchronization function 400 is an example of a para-virtualization of the pthread_mutex_lock standard synchronization API. At block 402 of FIG. 4, application code such as application instance 160 of FIG. 1 makes an API call to the spinlock based synchronization function 400, which can be part of the para-virtualized user library instance 180 of FIG. 1. The API call is received as a lock request for a granule in the shared data memory region 130 of FIG. 1. At block 404, an address of a granule identifier 210 in the synchronization structure 200 of FIG. 2 associated with the granule is resolved. Address resolution may be performed once at startup. At block 406, a test-and-set of a granule value 220 in the synchronization structure 200 associated with the granule identifier 210 is performed until the granule value 220 is successfully written to lock the granule. Test-and-set may include a check and conditional write as an atomic operation to increment the granule value 220 to reserve the lock. At block 408, data associated with the granule in the shared data memory region 130 are accessed upon locking the granule. Upon completion of exclusive data processing, at block 410, an application code API call is made to an unlock function which can be part of the para-virtualized user library instance 180 of FIG. 1. At block 412, the granule value 220 in the synchronization structure 200 is modified (e.g., decremented) to release the lock and continue with processing on non-shared data.

Figure 5:
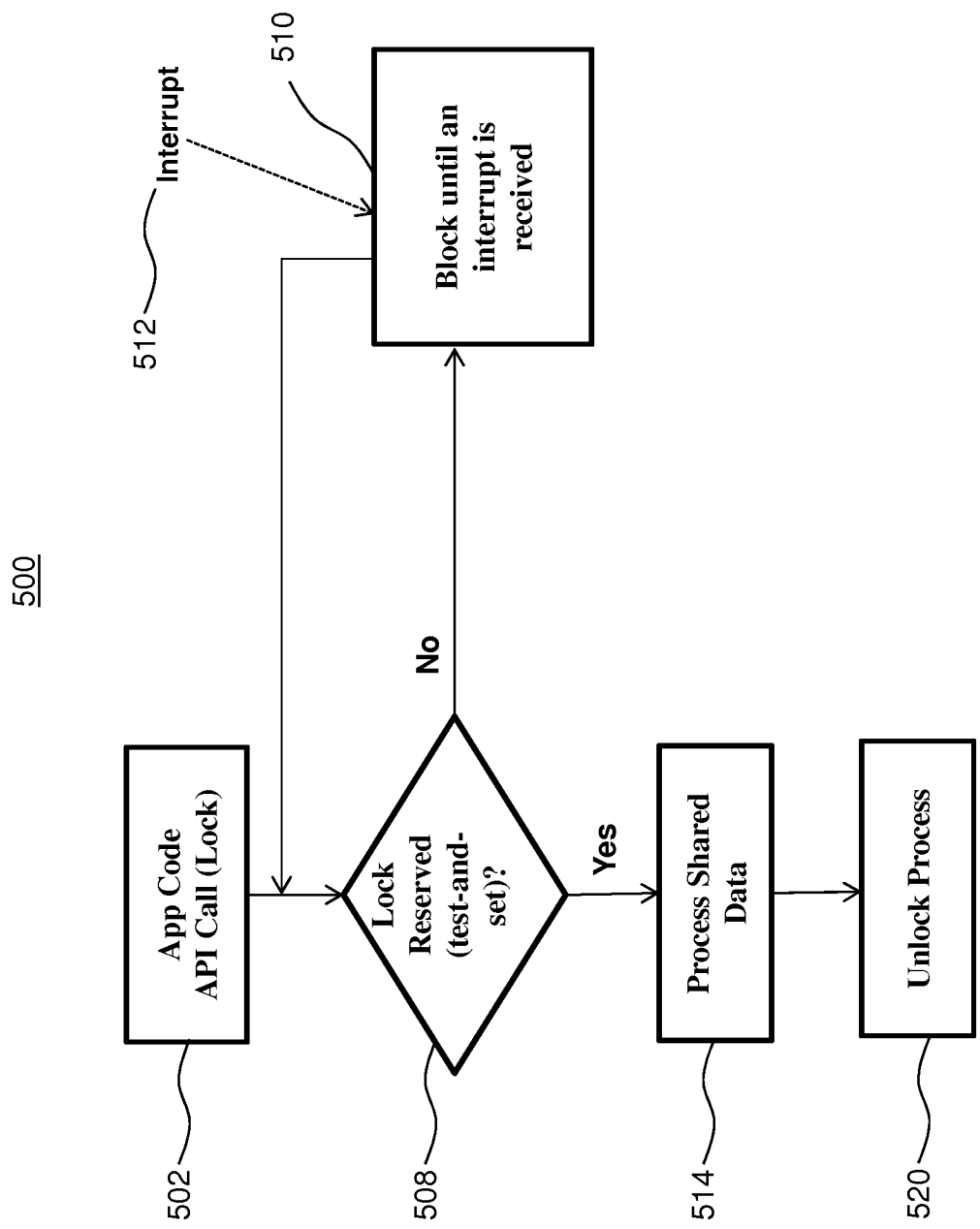
FIG. 5 illustrates an exemplary embodiment of a lock process of an interrupt based synchronization function.

An alternative to a spinlock is interrupt based synchronization. FIG. 5 illustrates an exemplary embodiment of a lock process of an interrupt based synchronization function 500. At block 502 of FIG. 5, application code such as application instance 160 of FIG. 1 makes an API call to the interrupt based synchronization function 500, which can be part of the para-virtualized user library instance 180 of FIG. 1. The API call is received as a lock request for a granule in the shared data memory region 130 of FIG. 1. An address of a granule identifier 210 in the synchronization structure 200 of FIG. 2 associated with the granule is resolved. Address resolution may be performed once at startup. The process registers for an interrupt with a separation kernel, such as SK 150 of FIG. 1. At block 508, a test-and-set of a granule value 220 in the synchronization structure 200 associated with the granule identifier 210 to lock the granule is performed. Test-and-set may include a check and conditional write as an atomic operation to increment the granule value 220 to reserve the lock. At block 510, based on failing to lock the granule, execution is suspended until interrupt 512 arrives. After the interrupt 512 arrives, the test-and-set of the granule value 220 is performed again by returning to block 508. When the lock is reserved, the granule value 220 is incremented as part of the test-and-set of block 508. At block 514, data associated with the granule in the shared data memory region 130 are accessed upon locking the granule. After processing of the data is completed, an unlock process 520 is performed. The unlock process 520 may vary depending upon whether single processing core or multi-processing core unlocking is performed.

Figure 6A:
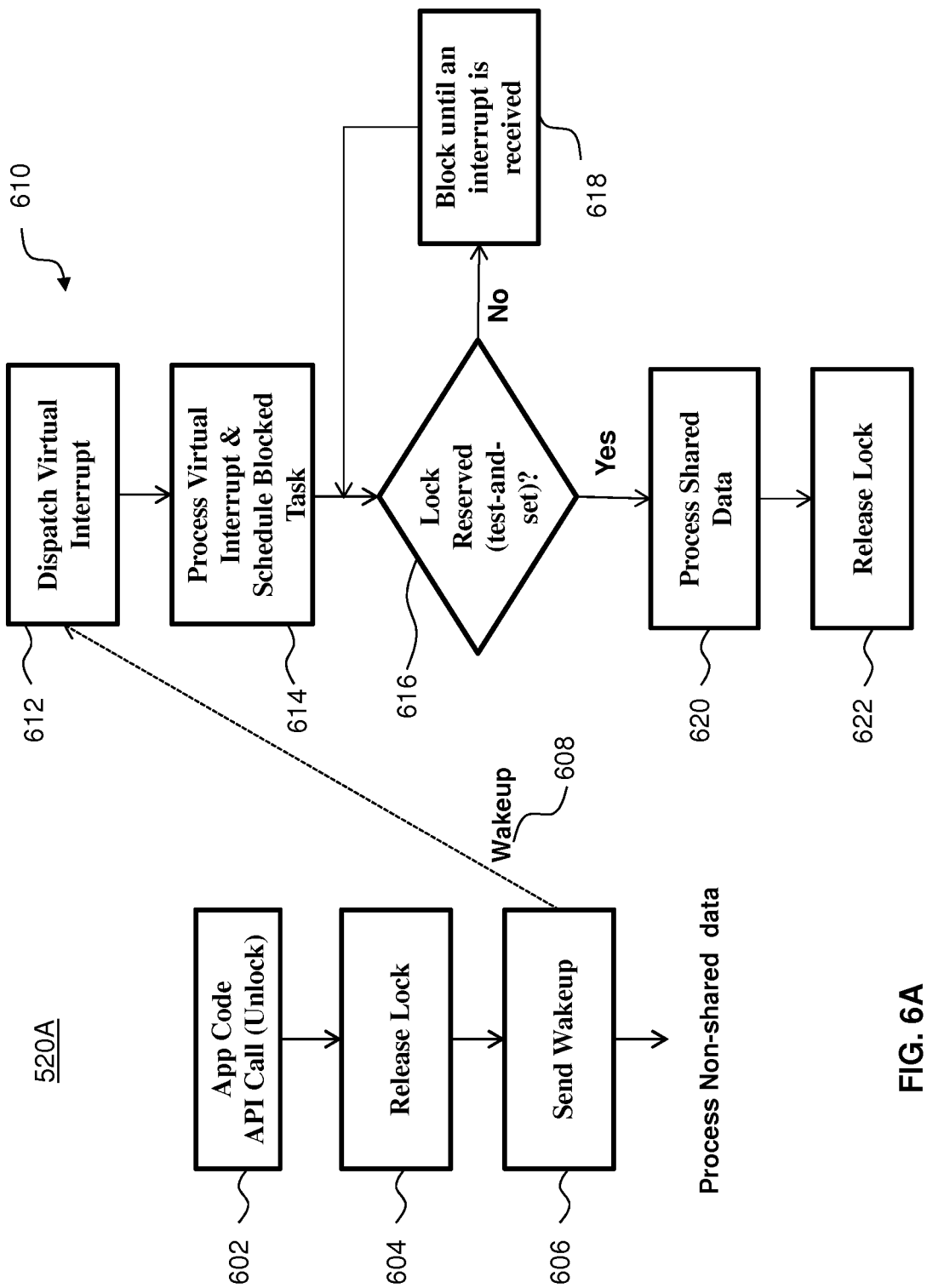
FIG. 6A illustrates an exemplary embodiment of an unlock process of an interrupt based synchronization function for a single processing core.

FIG. 6A illustrates an exemplary embodiment of an unlock process 520A of an interrupt based synchronization function for a single processing core. At block 602 of FIG. 6A, application code such as application instance 160 of FIG. 1 makes an API call to unlock a lock set by the interrupt based synchronization function 500 of FIG. 5, which can be part of the para-virtualized user library instance 180 of FIG. 1. The API call is received as an unlock request for a granule in the shared data memory region 130 of FIG. 1. The granule value 220 is decremented to release the lock at block 604.

At block 606, it is determined whether there are any blocked processes by examining the blocked process list 225 of FIG. 2. If there are blocked processes, one or more blocked processes selectively wakeup at block 606 under the control of the para-virtualized user library by sending a virtual interrupt as wakeup signal 608 to the SK of the same processing core, such as SK 150 of processing core 110, as part of a wakeup sequence 610 before continuing with the processing on non-shared data. At block 612 of the wakeup sequence 610, the SK dispatches a virtual interrupt to an associated virtualized environment, such as SK 150 and virtualized environment 140. At block 614, the virtualized environment processes the virtual interrupt and schedules a blocked task. At block 616, similar to block 508, an instance of the para-virtualized user library performs a test-and-set to reserve a lock. At block 618, based on failing to lock a granule, execution is suspended until another virtual interrupt arrives from block 614. After the virtual interrupt arrives, the test-and-set is performed again by returning to block 616. When the lock is reserved, the granule value 220 is incremented as part of the test-and-set of block 616. At block 620, data associated with the granule in the shared data memory region 130 are accessed upon locking the granule. After processing of the data is completed, the lock is released by decrementing the granule 220 at block 622.

A wakeup sequence can be predetermined using priority scheduling or a random sequence. The wakeup sequence is implemented by the para-virtualized user library based on the set of blocked tasks, pending tasks and the scheduling regime. Once the selected blocked process or processes are signaled, control returns to application code, such as the application instance 160 of FIG. 1. Rather than waking up all blocked processes and re-suspending all but one process, block 606 of FIG. 6A selectively wakes up blocked processes to avoid additional overhead associated with wakeup and re-suspension of processes that are not successful in immediate lock reservation.

Figure 6B:
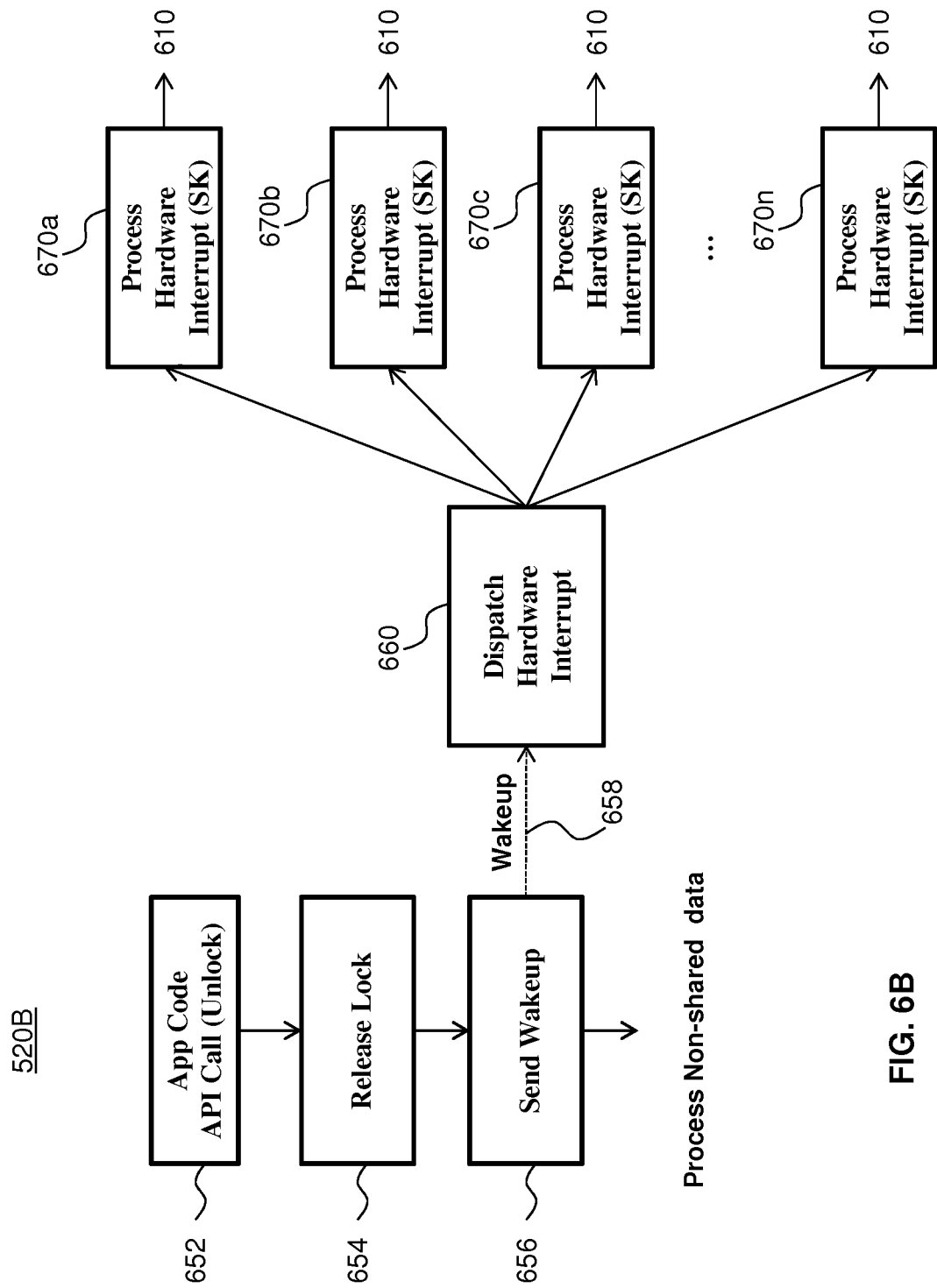
FIG. 6B illustrates an exemplary embodiment of an unlock process of an interrupt based synchronization function for multiple processing cores.

FIG. 6B illustrates an exemplary embodiment of an unlock process 520B of an interrupt based synchronization function for multiple processing cores. At block 652 of FIG. 6B, application code such as application instance 160 of FIG. 1 makes an API call to unlock a lock set by the interrupt based synchronization function 500 of FIG. 5, which can be part of the para-virtualized user library instance 180 of FIG. 1. The API call is received as an unlock request for a granule in the shared data memory region 130 of FIG. 1. The granule value 220 is decremented to release the lock at block 654.

At block 656, a virtual interrupt is sent using a hypercall as wakeup signal 658 to the SK of the same processing core, such as SK 150 of processing core 110, before continuing with the processing on non-shared data. At block 660, the SK dispatches a hardware interrupt to one or more other SKs on one or more other processing cores within the same domain, such as SKs 152 and 154 of processing cores 112 and 114 in domain 102. Each SK receiving the hardware interrupt, processes it respectively in blocks 670a-670n. Each of the SKs can then initiate a local instance of the wakeup sequence 610 of FIG. 6A.

Interrupts can be initiated by one SK and sent to other SKs in the same domain even though they are associated with different virtualized environments. For example, the SK 150 of FIG. 1 can handle hardware interrupts and pass interrupts to SKs 152 and 154. Interrupts for synchronization can be para-virtualized to customize the behavior of virtualized interrupts. For example, additional codes, status, and actions can be defined for synchronization interrupts. In one embodiment, all blocked or pending processes wakeup in response to an interrupt, and all processes that are not successful in lock reservation return to a suspended or blocked state until the next interrupt.

Figure 7:
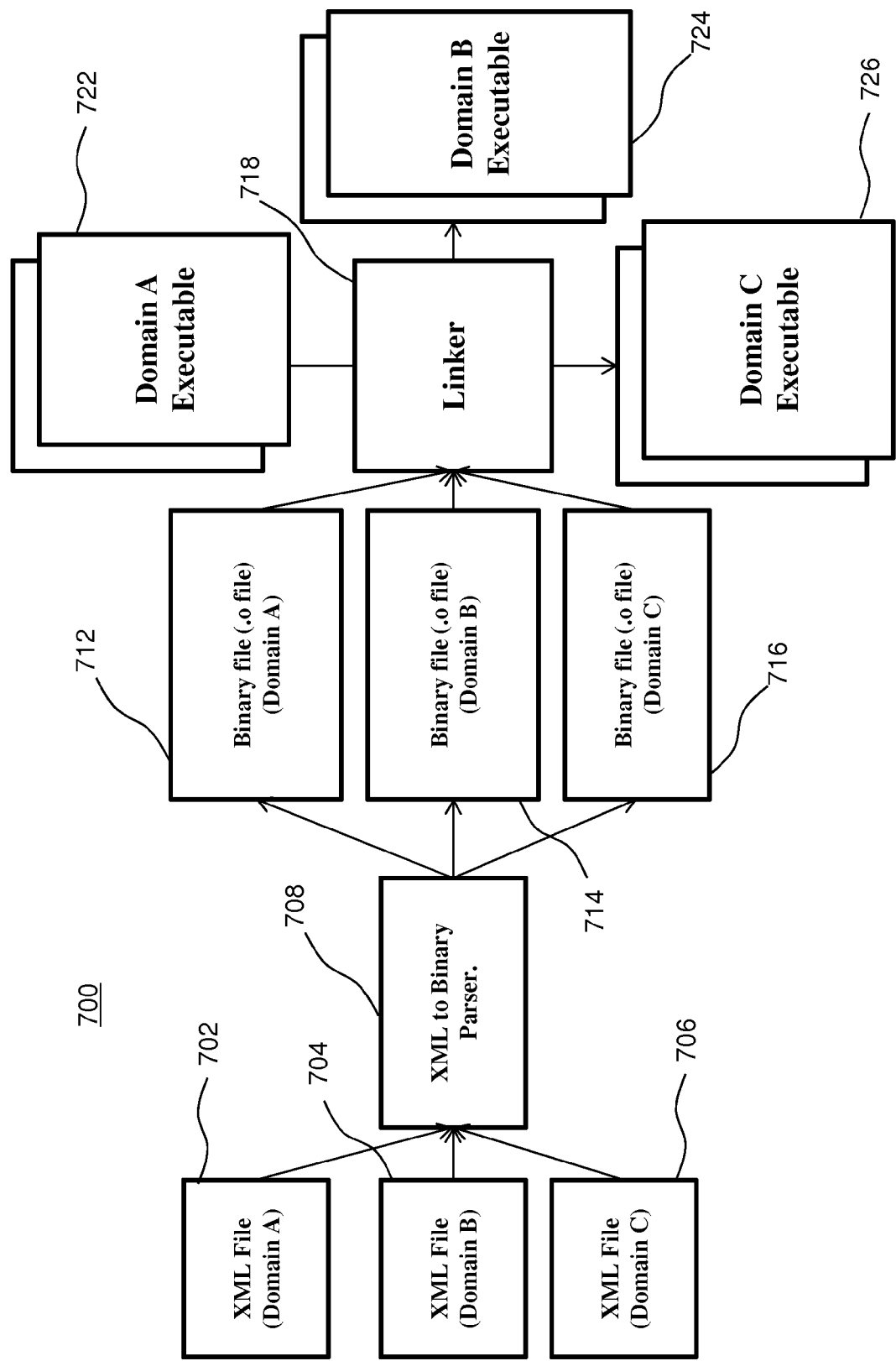
FIG. 7 illustrates an exemplary process for building applications supporting multiple independent levels of security.

FIG. 7 illustrates an exemplary process 700 for building applications supporting multiple independent levels of security. In the example of FIG. 7, extensible markup language (XML) files 702, 704, and 706 are defined for separate domains A, B, and C, which may correspond to domains 102-106 of FIG. 1. The XML file 702 can define memory regions for the synchronization memory region 120 and shared data memory region 130 of the first domain 102 of FIG. 1, while the XML files 704 and 706 statically define synchronization and shared data memory regions for domains 104 and 106 of FIG. 1 respectively. An XML to binary parser 708 can be used to parse each of the XML files 702-706 and produce corresponding binary files 712, 714, and 716. A linker 718 separately links the binary files 712-716 with appropriate library files that include APIs for synchronization to produce executable files 722, 724, and 726 for each of the domains. The executable files 722-726 can become application instances in the system 100 of FIG. 1. For example, executable files 722 can be application instances 160, 162, and 164 of FIG. 1 when the linker 718 and associated files are configured for each of the corresponding virtualized environments 140-144 of FIG. 1.

The technical effects and benefits of the embodiments described herein provide synchronizing parallel applications in an asymmetric multi-processing system having multiple independent levels of security. Using para-virtualized standard synchronization application programming interfaces allows for porting of existing applications with minimal modification and redesign to run on an AMP MILS system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for synchronizing parallel applications in an asymmetric multi-processing system having multiple independent levels of security, the method comprising:
   providing synchronized access to a shared data memory region for a first application through a first instance of a para-virtualized user library linked against the first application in a first virtualized environment in a first domain having a first level of security, wherein the synchronized access is provided through a para-virtualized standard synchronization application programming interface implemented as a user library accessing a synchronization structure through a first separation kernel;
   providing synchronized access to the shared data memory region for a second application in parallel with the first application through a second instance of the para-virtualized user library linked against the second application in a second virtualized environment in the first domain having the first level of security, the second instance of the para-virtualized user library accessing the synchronization structure through a second separation kernel, wherein one or more processes of the first virtualized environment are blocked when the shared data memory region is locked through the second virtualized environment, the second virtualized environment passing a virtual interrupt to the second separation kernel upon lock release, and based on receiving the virtual interrupt, the second separation kernel sending a hardware interrupt to the first separation kernel to initiate a wakeup sequence in the first virtualized environment; and
   preventing access to the shared data memory region and the synchronization structure by other applications in one or more other domains having other levels of security per domain based on a memory management unit configuration having access controlled by the first and second separation kernels.

2. The method of claim 1, further comprising:
   accessing the synchronization structure to coordinate the synchronized access between the first and second applications, wherein the synchronization structure is statically defined comprising: granule identifiers for a plurality of shared data memory granules, granule values, blocking conditions, and pending conditions.

3. The method of claim 2, wherein each of the shared data memory granules is an independently lockable section of the shared data memory region having a lock status defined by the granule values, the blocking conditions comprise a list of blocking applications, and the pending conditions comprise a list of pending signals associated with each of the granule identifiers.

4. The method of claim 1, wherein the para-virtualized user library comprises modified portable operating system interface functions presented to the first and second applications as standard synchronization application programming interfaces.

5. The method of claim 1, further comprising:
configuring the first and second separation kernels to prevent memory management unit modifications from changing memory allocation associated with the shared data memory region and the synchronization structure.

6. The method of claim 4, wherein the modified portable operating system interface functions include a spinlock based synchronization function comprising:
receiving a lock request for a granule in the shared data memory region;
resolving an address of a granule identifier in the synchronization structure associated with the granule;
performing a test-and-set of a granule value in the synchronization structure associated with the granule identifier until the granule value is successfully written to lock the granule;
accessing data associated with the granule in the shared data memory region upon locking the granule; and
modifying the granule value in the synchronization structure to release the lock.

7. The method of claim 4, wherein the modified portable operating system interface functions include an interrupt based synchronization function comprising:
receiving a lock request for a granule in the shared data memory region;
resolving an address of a granule identifier in the synchronization structure associated with the granule;
registering for an interrupt;
performing a test-and-set of a granule value in the synchronization structure associated with the granule identifier to lock the granule;
based on failing to lock the granule, suspending execution until the interrupt arrives and performing the test-and-set of the granule value after the interrupt arrives;
accessing data associated with the granule in the shared data memory region upon locking the granule;
modifying the granule value in the synchronization structure to release the lock; and
sending the interrupt to one or more other blocked processes upon releasing the lock.

8. The method of claim 1, wherein the first domain comprises a plurality of processing cores, the synchronization structure is located in a synchronization memory region statically defined using an extensible markup language to binary parser and a linker, and the synchronization structure is loaded by a boot loader prior to releasing the processing cores of the first domain.

9. An asymmetric multi-processing system having multiple independent levels of security, comprising:
a memory management unit;
a first domain having a first level of security; and
one or more other domains having other levels of security per domain;
wherein the first domain comprises one or more processing cores, a synchronization memory region, and a shared data memory region, the first domain configured to:
provide synchronized access to the shared data memory region for a first application through a para-virtualized user library linked against the first application in a first virtualized environment in, wherein the synchronized access is provided through a para-virtualized standard synchronization application programming interface implemented as a user library accessing a synchronization structure of the synchronization memory region through a first separation kernel;
provide synchronized access to the shared data memory region for a second application in parallel with the first application through a second instance of the para-virtualized user library linked against the second application in a second virtualized environment, the second instance of the para-virtualized user library accessing the synchronization structure through a second separation kernel, wherein one or more processes of the first virtualized environment are blocked when the shared data memory region is locked through the second virtualized environment, the second virtualized environment passes a virtual interrupt to the second separation kernel upon lock release, and based on receipt of the virtual interrupt, the second separation kernel sends a hardware interrupt to the first separation kernel to initiate a wakeup sequence in the first virtualized environment; and
prevent access to the shared data memory region and the synchronization structure by the one or more other domains based on a configuration of the memory management unit as controlled by the first and second separation kernels.

10. The asymmetric multi-processing system of claim 9, wherein the first domain is further configured to access the synchronization structure to coordinate the synchronized access between the first and second applications, and the synchronization structure is statically defined comprising: granule identifiers for a plurality of shared data memory granules, granule values, blocking conditions, and pending conditions.

11. The asymmetric multi-processing system of claim 10, wherein each of the shared data memory granules is an independently lockable section of the shared data memory region having a lock status defined by the granule values, the blocking conditions comprise a list of blocking applications, and the pending conditions comprise a list of pending signals associated with each of the granule identifiers.

12. The asymmetric multi-processing system of claim 9, wherein the para-virtualized user library comprises modified portable operating system interface functions presented to the first and second applications as standard synchronization application programming interfaces.

13. The asymmetric multi-processing system of claim 9, wherein the first and second separation kernels in the first domain are configured to prevent modifications of the memory management unit from changing memory allocation associated with the shared data memory region and the synchronization structure.

14. The asymmetric multi-processing system of claim 12, wherein the modified portable operating system interface functions include a spinlock based synchronization function configured to:
receive a lock request for a granule in the shared data memory region;
resolve an address of a granule identifier in the synchronization structure associated with the granule;

perform a test-and-set of a granule value in the synchronization structure associated with the granule identifier until the granule value is successfully written to lock the granule;

access data associated with the granule in the shared data memory region upon locking the granule; and modify the granule value in the synchronization structure to release the lock.

15. The asymmetric multi-processing system of claim 12, wherein the modified portable operating system interface functions include an interrupt based synchronization function configured to:

receive a lock request for a granule in the shared data memory region;

resolve an address of a granule identifier in the synchronization structure associated with the granule;

register for an interrupt;

perform a test-and-set of a granule value in the synchronization structure associated with the granule identifier to lock the granule;

based on failing to lock the granule, suspend execution until the interrupt arrives and perform the test-and-set of the granule value after the interrupt arrives;

access data associated with the granule in the shared data memory region upon locking the granule;

modify the granule value in the synchronization structure to release the lock; and send the interrupt to one or more other blocked processes upon releasing the lock.

16. The asymmetric multi-processing system of claim 15, wherein the synchronization memory region is statically defined using an extensible markup language to binary parser and a linker, and the synchronization structure is loaded by a boot loader prior to releasing the one or more processing cores of the first domain.

* * * * *